United States Patent [19]

Riebel et al.

[11] Patent Number: 5,611,882

[45] Date of Patent: Mar. 18, 1997

[54] BOARD STOCK AND METHOD OF MANUFACTURE FROM RECYCLED PAPER

[75] Inventors: Michael J. Riebel, Mankato; Donald E. Anderson, Northfield; Carl Gruber, Le Seur; Paul Torgusen, New Ulm; Robert DeGezelle; Molly DeGezelle, both of Mankato, all of Minn.

[73] Assignee: Phenix Biocomposites, Inc., St. Peter, Minn.

[21] Appl. No.: 211,567

[22] PCT Filed: Aug. 11, 1993

[86] PCT No.: PCT/US93/07538

§ 371 Date: May 2, 1994

§ 102(e) Date: May 2, 1994

[87] PCT Pub. No.: WO94/04360

PCT Pub. Date: Mar. 3, 1994

[51] Int. Cl.⁶ .................................. B27N 3/00; C09J 4/00
[52] U.S. Cl. ................ 156/272.2; 156/62.2; 156/244.11; 156/245; 156/273.7; 156/336; 264/109; 264/123; 264/176.1; 264/245; 264/460; 264/489; 428/532; 428/537.5; 428/903.3
[58] Field of Search ................................ 156/328, 336, 156/62.2, 244.11, 245, 272.2, 273.7; 428/537.5, 903.3; 264/109, 115, 120, 128, 123, 73, 245, 176.1, 207

[56] References Cited

U.S. PATENT DOCUMENTS

| | | |
|---|---|---|
| 906,043 | 12/1908 | Malcolm . |
| 1,689,732 | 10/1928 | Laucks et al. . |
| 1,724,695 | 8/1929 | Davidson et al. . |
| 1,777,157 | 9/1930 | Biddle . |
| 1,777,158 | 9/1930 | Biddle . |
| 1,777,159 | 9/1930 | Biddle . |
| 1,777,160 | 9/1930 | Biddle . |
| 1,777,161 | 9/1930 | Biddle . |

(List continued on next page.)

FOREIGN PATENT DOCUMENTS

| | | |
|---|---|---|
| 36603/84 | 12/1984 | Australia . |
| 2718622 | 11/1978 | Germany . |
| 3545001 | 7/1986 | Germany .......................... 428/903.3 |
| 62-007503 | 1/1987 | Japan . |
| 4219203 | 8/1992 | Japan . |
| 832227 | 4/1960 | United Kingdom . |
| 2199333 | 7/1988 | United Kingdom . |

OTHER PUBLICATIONS

J. Anderson et al., "Farm Program Helps Japanese", *San Antonio Express News*, Jun. 9, 1993.

J. Anderson et al., "USDA Promoting New Uses for Farm Products", *United Feature Syndicate*, Jun. 9, 1993.

A. Balden, "Binders from Soy Flour", *Chemical Abstracts*, 106, No. 24, Abstract No. 198031, Jun. 5, 1987.

A. Behling, "Soybean-Based Building Material Creates Excitement", *Soybean Digest*, p. 28, Aug./Sep. 1993.

(List continued on next page.)

*Primary Examiner*—David A. Simmons
*Assistant Examiner*—M. Curtis Mayes
*Attorney, Agent, or Firm*—Mueting, Raasch, Gebhardt & Schwappach, P.A.

[57] ABSTRACT

A cellulose mixture including a protein based adhesive binder and colorant. The mixture can be compression molded or extruded and upon curing in the presence of microwave or radio frequency energy or in thermally controlled appliance, produces board or shape formed stock. The produced stock exhibits colorations and a grain pattern comparable to natural stone. Unlike stone, the material exhibits a light weight, low density, structural rigidity and ready machinability. A preferred method includes admixing separate, colorized batches of feedstock, each feedstock includes shredded waste newsprint, soybean flour, water and a colorant; reducing the moisture content of each feedstock or a proportioned admixture of several feedstocks, such as by air drying or compressing or performing the admixture in the presence of heat; compacting the admixture to final shape; and curing the shaped material. Final forming and finishing apparatus complete the process.

24 Claims, 5 Drawing Sheets

U.S. PATENT DOCUMENTS

| | | | |
|---|---|---|---|
| 1,777,162 | 9/1930 | Biddle . | |
| 1,864,333 | 6/1932 | Aldrich . | |
| 1,892,486 | 12/1932 | Dunham . | |
| 1,951,940 | 3/1934 | Manson | 92/54 |
| 1,976,435 | 10/1934 | Cone et al. | 87/17 |
| 2,026,765 | 1/1936 | Woodford | 92/54 |
| 2,105,593 | 1/1938 | Hatton | 92/57 |
| 2,156,308 | 5/1939 | Schuh | 92/21 |
| 2,156,311 | 5/1939 | Schuh | 92/21 |
| 2,178,566 | 11/1939 | Dike et al. | 144/309 |
| 2,580,391 | 1/1952 | Babcock et al. | 156/328 X |
| 2,699,097 | 1/1955 | Binkley | 92/55 |
| 2,754,240 | 7/1956 | Kinney | 154/141 |
| 2,788,305 | 4/1957 | Sheeran | 156/336 X |
| 2,810,657 | 10/1957 | Preusser | 156/336 X |
| 2,894,847 | 7/1959 | Wright | 156/336 X |
| 2,963,454 | 12/1960 | Drugge et al. | 156/328 X |
| 3,070,485 | 12/1962 | Strickman | 162/135 |
| 3,444,109 | 5/1969 | Golick et al. | 156/328 X |
| 3,456,355 | 7/1969 | Cumming et al. | 34/1 |
| 3,667,880 | 6/1972 | Malet et al. | 425/3 |
| 3,677,850 | 7/1972 | Holt et al. | 156/328 X |
| 3,684,641 | 8/1972 | Murphy | 161/129 |
| 3,713,881 | 1/1973 | Akiyama et al. | 117/155 |
| 3,718,536 | 2/1973 | Downs et al. | 428/903.3 X |
| 3,736,221 | 5/1973 | Evers et al. | 264/115 X |
| 3,769,116 | 10/1973 | Champeau | 156/62.8 |
| 3,779,860 | 12/1973 | Oshida et al. | 162/129 |
| 3,819,456 | 6/1974 | Enfield | 428/903.3 X |
| 3,841,885 | 10/1974 | Jakel | 106/93 |
| 3,895,998 | 7/1975 | Haywood et al. | 162/100 |
| 3,927,235 | 12/1975 | Chow | 428/302 |
| 3,984,275 | 10/1976 | Hofmann et al. | 156/336 X |
| 4,012,561 | 3/1977 | Doughty et al. | 428/531 |
| 4,018,642 | 4/1977 | Pike et al. | 156/272 |
| 4,111,730 | 9/1978 | Balatinecz | 156/62.2 |
| 4,148,952 | 4/1979 | Nelson et al. | 428/903.3 X |
| 4,184,311 | 1/1980 | Rood | 53/434 |
| 4,216,179 | 8/1980 | Lamberts et al. | 264/120 X |
| 4,234,658 | 11/1980 | Chow | 428/403 |
| 4,300,322 | 11/1981 | Clark | 52/406 |
| 4,339,363 | 7/1982 | Nakagima | 524/34 |
| 4,350,567 | 9/1982 | Moorehead et al. | 162/145 |
| 4,356,060 | 10/1982 | Neckermann et al. | 162/181.6 |
| 4,373,955 | 2/1983 | Bouchard et al. | 106/88 |
| 4,377,440 | 3/1983 | Gasland | 162/101 |
| 4,382,847 | 5/1983 | Akesson et al. | 204/159.12 |
| 4,407,697 | 10/1983 | Sadler et al. | 428/537.5 X |
| 4,468,336 | 8/1984 | Smith | 252/62 |
| 4,497,662 | 2/1985 | Chisholm et al. | 106/92 |
| 4,530,196 | 7/1985 | O'Bryan | 52/747 |
| 4,543,159 | 9/1985 | Johnson et al. | 162/164.1 |
| 4,608,089 | 8/1986 | Gale et al. | 106/90 |
| 4,624,383 | 11/1986 | Moore | 220/23.4 |
| 4,693,749 | 9/1987 | Gale | 106/99 |
| 4,695,695 | 9/1987 | Meek et al. | 219/10.55 |
| 4,708,623 | 11/1987 | Aoki et al. | 425/202 |
| 4,710,309 | 12/1987 | Miller | 252/62 |
| 4,722,854 | 2/1988 | Cope | 427/280 |
| 4,769,109 | 9/1988 | Tellvik et al. | 162/123 |
| 4,810,445 | 3/1989 | Lamb, Sr. et al. | 264/112 |
| 4,812,492 | 3/1989 | Eckes et al. | 523/351 |
| 4,814,012 | 3/1989 | Paul et al. | 106/38.51 |
| 4,840,817 | 6/1989 | Murakami et al. | 427/45.1 |
| 4,899,513 | 2/1990 | Morris . | |
| 4,937,021 | 6/1990 | Danforth et al. | 264/26 |
| 4,957,668 | 9/1990 | Plackard et al. | 264/23 |
| 4,963,603 | 10/1990 | Felegi, Jr. et al. | 524/13 |
| 4,994,113 | 2/1991 | Helmstetter | 106/618 |
| 4,994,148 | 2/1991 | Shetka | 162/227 |
| 5,011,741 | 4/1991 | Hoffman | 428/503.1 |
| 5,064,504 | 11/1991 | Shetka | 162/396 |
| 5,075,057 | 12/1991 | Hoedl | 264/115 |
| 5,075,131 | 12/1991 | Hattori et al. | 427/45.1 |
| 5,093,051 | 3/1992 | Reiniger | 264/120 X |
| 5,134,023 | 7/1992 | Hsu | 264/115 X |
| 5,244,942 | 9/1993 | Hover et al. | 264/245 X |
| 5,280,051 | 1/1994 | Traverso et al. | 264/73 X |

OTHER PUBLICATIONS

Black et al., "NewStone May Be A Treasure For Soybean Growers", *Farming Today*, 10, cover page and p. 15, 1992.

A.J. Brandel, "Entrepreneur Combines Environmental and Agricultural Concerns to Develop New Product", *Highlights*, Oct. 1992.

A.J. Brandel, "Soybean–based New Stone Cut From Leafy Mold", *Agri News*, Aug. 20, 1992.

J. Brissett et al., "Sixth Grader's Idea Sparks Company Backed By Millions", *Corporate Report Minnesota*, pp. 22–23, Aug. 1993.

R.S. Burnett, "Nature and Evaluation of Protein Modification" in *Soybeans and Soybean Products*; Interscience Publishers, Inc.: New York, NY; pp. 1004–1011; 1951.

R.S. Burnett, "Soybean Flour Paper–Coating Adhesives" in *Soybeans and Soybean Products*; Interscience Publishers, Inc.: New York, NY; pp. 1024–1025; 1951.

J. L. Carter, "New Stone Building Material of the Future" *Herald–Dispatch*,p. 4A Mar. 4, 1993.

N. Chatterjee, "Plastic Composition", *Chemical Abstracts*, 46, No. 13, Col. 7821, Jan. 1952.

M. DeGezelle, "Is It Possible To Recycle Paper Into a Usable Building Material?", poster presented at St. Joseph–St. John's School, Mankato, MN, pp. 1–5, Mar. 7, 1991.

M. DiChristina (Ed.), "Paper Bricks", *Popular Science*, pp. 46–47 (Feb. 1992).

L. Eastlund, "Friendly Invention—Teacher Develops New Building Product", *Daily News*, Feb. 3, 1993.

A.A. Horvath, "Adhesive and Sizing Materials" in *The Soybean Industry*; The Chemical Publishing Co.: New York; Chapter XIX; pp. 183–188 (1938).

D. Keller, "Romancing the NewStone", *U.S. News*, Jan. 1993.

A.L. Lambuth, "Soybean Glues" in *Handbook of Adhesives*; I. Skeist, Ed.; pp. 148–157; 1962.

R. Larson, "A Bright Future—Soybean–Related Inventions Could Be A Boon", *Agriculture Today*, Mar. 24, 1993.

S. Menton, "Girl Recycles Old Papers Into A Strong New Board", *Mankato Free Press*, Jun. 14, 1991.

M. Morris, "A House for All Reasons", *Popular Science*, pp. 66–71, 102–106 (Mar. 1993).

D. Muhm, "Mix Soybeans, Old Paper: What Do You Get?", *Des Moines Register*, Aug. 1992.

T. Nhan, "'NewStone' is Touted as Building Material", *The St. Paul Pioneer Press*, Aug. 16, 1992.

T. Nhan, "A Desk Made Out Of Soybeans?", *St. Paul Pioneer Press*, Aug. 14, 1992.

J. Olson et al., "Building Materials from Soybeans and Waste Paper", *AG Innovation News*, p. 12, Oct. 1992.

N. Pignatello, "Common Materials Evolve Into New Products", *Fedgazette*, p. 16, Apr. 1993.

Albany Plylock, *The Timberman*, pp. 35–38 (Jul., 1941).

S. Schmickle, "'NewStone' Could Be More Than A Hill of Beans", *Star Tribune*, Aug. 13, 1992.

K. Schulz, "Soybeans are Turning to Stone", *The Land*, 17, p. 2, Jan. 29, 1993.

F.R. Senti et al., "Fibrous From Globular Proteins", *J. Phys. Chem.*, 49, pp. 192–210 (1945).

P.J. Skerrett, "Wood Replacement Uses Trash", *Popular Science*, p. 44, (Feb. 1993).

J. Spear, "Making a Breakthrough . . . Paper, Soybeans Turned Into Building Blocks", *Mankato Free Press*, Dec. 1992.

J. Spear, "Company Gets $1 Million Loan to Begin Production" in *Free Press*, Apr. 21, 1993.

"A New Building Material Made from Soybeans and Wastepaper", *National Soybean Checkoff—Facts and Figures*, 1, Sep. 1992.

ASTM Designation: E–84–91a, "Standard Test Method for Surface Burning Characteristics of Building Materials", pp. 300–314, Oct. 1991.

ASTM Designation: D 1037–91: "Standard Test Methods for Evaluating Properties of Wood–Based Fiber and Particle Panel Materials", pp. 170–199, Dec. 1991.

"Another New Use For Soybeans", *The Soy Bin*, Sep. 1992.

"Builders to Test Material Made of Newspaper, Soybeans", *Business Farm*, p. E1, Feb. 7, 1993.

"Building With Soybeans", *The Farmer*, Sep. 8, 1992.

"Cash Is King in Mankato/North Mankato", *Minnesota Ventures*, 42–50, Jun. 1993.

Cutler–Magner Company Material Safety Data Sheet—Product Name: Rockport Hydrated Lime; pp. 1–3; Mar. 6, 1991.

H.B. Fuller Company Technical Information bulletin; Waterproofing Additive for Corrugating Adhesives, with Low Free Formaldehyde and Good Viscosity Stability; pp. 1–5; Mar. 19, 1992.

Honeymead Products Company Material Safety Data Sheet—Product Name: Soybean Flour, Flakes, High Energy Meal; Dec. 11, 1992.

"Minnesota Pilot Plant to Manufacture New Soy–Based Product", Aug. 12, 1992.

"NewStone Creating New Opportunities", *Raymond News*, Aug. 19, 1992.

NewStone ad in "Week in Review", *Successful Business*, Aug. 24, 1992.

Occidental Chemical Company Material Safety Data Sheet—Product Name: 45% Caustic Potash–Commercial Grade; pp. 1–9; May 30, 1989.

PQ Corporation Material Safety Data Sheet—Product Name: Soybean Glue Component; pp. 1–2; Oct. 27, 1988.

Phenix Composites, Inc., *Star Tribune*, Apr. 21, 1993.

Phenix Composites, Inc., *Pioneer Press*, Apr. 21, 1993.

"Phenix Makes Woodlike Composite Out Of Recycled Paper and Soybean Waste", *Industrial Bioprocessing*, p. 3, Oct. 1992.

"Phenix to Offer Granite–Like Composite", *Furniture/Today*, Jun. 14, 1993.

SCM Glidco Organics Material Safety Data Sheet—Product Name: Pine Oil; pp. 1–3; Apr. 2, 1992.

Soybean Digest Blue Book; American Soybean Association: Hudson, Iowa; p. 127, Mar. 1974.

"Soybean Farmers Push Quasi–Plastic Building Material", *The Cedar Rapids Gazette*, Aug. 14, 1992.

International Search Report, dated Dec. 2, 1994.

BOARD STOCK AND METHOD OF MANUFACTURE FROM RECYCLED PAPER

BACKGROUND OF THE INVENTION

The present invention relates to byproducts of recycled paper and, in particular, to a molded stock formed from one or more relatively dry, colorized batches of admixture ingredient. Each batch ingredient includes a soybean derived adhesive binder, a separate colorant and other additives. Predetermined concentrations of the batch ingredients are combined and cured under pressure in the presence of microwave, radio frequency or thermal energy.

With growing concerns and pressures to find alternative uses for waste matter, various efforts have been directed to developing conversion processes for deriving usable products from recycled newsprint and other paper stocks. The majority of these efforts have been directed to producing building insulation materials in shredded form and in molded sheet form. Such sheet goods can comprise recycled paper or relatively more dense or thicker materials such as construction grade panel board or liana board. These processes may include the addition of various adhesives and additives, molding and curing steps.

Processes directed to the production of insulation materials can be found upon directing attention to U.S. Pat. Nos. 4,184,311 and 4,300,322. The former patent discloses a molded insulation product laminated to an outer covering. The latter discloses a dry shredded mixture which is injected into a batting envelope and which envelope can be mounted in conventional fashion. Sprayed processes also exist in which shredded newsprint particulate is mixed with water and sprayed into structural spaces, where the material hardens, after skimming away excess material. Australian application Serial No. 36603/84 entitled Improved Insulation Product also discloses a molded newsprint insulation. The material is principally air cured, although reference is made to microwave curing.

U.S. Pat. No. 4,148,952 discloses a process for partially shredding and consolidating waste paper to facilitate transport. U.S. Pat. Nos. 4,111,730 and 5,011,741, otherwise, disclose processes wherein a binder derived from a cooked starch and urea formaldehyde resin are added to slurries which are molded under pressure and cured to form uncolored board stocks. The former may also be used as a structural building member.

U.S. Pat. Nos. 4,994,148 and 5,064,504 also disclose methods for creating molded structural blocks from a newsprint slurry which is formed in a screen wall molding chamber. A plaster or cement binder is also disclosed. Curing of the blocks is effected through air drying.

Various adhesive preparations, including soybean derived adhesives, for a broad range of laminate gluing applications are also disclosed in the Handbook of Adhesives, Van Nostrand Rheinhold (1962).

Finished materials produced by the prior art, unless separately laminated with a decorative finish laminate, have uniformly demonstrated undesirable dull grey or matte grey colors without any distinctive or aesthetically appealing pattern.

Unknown in the prior art is a process utilizing unprocessed waste papers to form decorative, structurally stable building stocks having a natural stone appearance and which stocks can be molded or extruded as sheet goods or in a variety of shaped forms. Natural stone appearing stock requiring specific bulk color patterns and/or esthetically pleasing surface textures are especially unknown for use as finished surface treatments, such as for floors, walls, ceilings and furniture.

The lack of such a construction stocks is believed due to a variety of factors, including: (1) shredding and re-pulping of waste paper reduces the length of the cellulose fibers and thereby compromises the tear and shear strength of the finished material; (2) the prior lack of means for repeatedly producing an aesthetically pleasing texture and coloration of the finished material; (3) costly de-inking and bleaching of the pulp stock which reduces the competitiveness of the material; and (4) the potential presence of unknown and undesired contaminates in the raw waste paper stock that can deleteriously effect surface finish and structural integrity of the produced stock.

Otherwise, it has been found that irregularly patterned, multi-colored materials such as the mineral aggregates and, for example, granite, are not easily duplicated or replicated in modern composites or laminates. These difficulties have been resolved through an appreciation of the process of forming natural stone and the relationship of human perceptions of natural stone.

That is, natural stone is formed from densely packed random crystals of variously colored minerals which, over time, in response to specific physical laws combine toward a minimum energy system. Such a process parallels recent understandings of the theories of ordered chaotic systems pioneered by F. Mandelbrot. Human eye-brain perceptions in contrast are learned and thus any recognition and appreciation that a material is "natural" or "artificial" is formed upon a mental comparison in relation to learned perceptions made by each observer. Because the artificially produced materials of the invention closely approximate the natural random ordering of stone, particularly granite, the resultant material is perceived to be granite.

SUMMARY OF THE INVENTION

In appreciation of the above and to overcome the shortcomings of the known art, the present invention seeks to provide a structurally rigid material that exhibits colorized patterns and a bulk texture resembling granite and other natural stones. The invention also discloses the processes necessary to repeatedly fabricate board stock laminates and shape formed products which exhibit a variety of colored and textured patterns that simulate virtually any available building stone.

In one of the processes, the material is molded to form sheet stocks or is extruded to various shapes, which may be further laminated, embossed in cameo or intaglio or inlaid with other materials. The end products are producible from a base process that includes the mixing of one or more colorized ingredient batches containing a cellulosic pulp and a protein rich adhesive binder, most notably a processed soybean derivative, and the curing of a prepared mixture in the presence of radio frequency, microwave energy or thermal energy.

It is accordingly a primary object of the invention to provide a variety of products derived from mixtures containing shredded or pulverized paper, preferably newsprint, an adhesive binder, and desired colorants and cured under conditions of heat and pressure.

It is still a further object of the invention to obtain natural stone appearing and structurally stable materials which can be repeatedly produced.

It is a further object of the invention to provide mixtures including a binder comprising derivatives of agricultural grains and pulse crops, particularly, soybeans with or without natural oils.

It is a further object of the invention to provide mixtures having controlled ph characteristics and including additives such as sodium hydroxide, polyvinyl acetate, and aluminum sulfate, which permit the coagulation into a comparatively dry mixture, and which upon compaction in the presence of radio frequency, microwave or thermal energy enables desired properties in the derived stock.

It is a further object of the invention to provide a fabrication methodology including the pre-drying of each colorized, ingredient batch or the admixture to a preferred moisture content, for example, by applying one or more heating or curing steps, interspersed with multiple compression steps, whereby a preferred moisture content is obtained.

It is a still further object of the invention to heat and/or cure the ingredient mixtures in the presence of radio frequency, microwave energy or thermal energy and wherein the forming molds can comprise the oven electrodes.

Various of the foregoing objects, advantages and distinctions are obtained in a preferred method of manufacture which for a single colorant feedstock includes the preparation of an alkaline pH adhesive binder from a soybean derivative and water; adding a colorant to the binder; mixing the binder with suitably shredded or pulverized newsprint and drying the mixture a "semidry" mass of a preferred moisture in the range of 12 to 20 percent; compressing the mixture to form; and heating the formed mixture until cured. In one preferred method, controlled curing is obtained in the presence of radio frequency or microwave energy, which may be applied via plates which are machined to the shape of a molded end product. Alternatively, the mixture can be extruded and or cured in the presence of microwave, RF or thermal energy or combinations thereof. The cured stock may also be kiln dried and stored in a controlled humidity environment to enhance dimensional stability.

One preferred end product is a structural laminate having a natural stone appearance. The apparent granularity or pattern of the material is determined from the consistency of separately colored ingredient feedstocks which are admixed.

The stone-like granularity is believed to result from coagulation or "curdling" that occurs during the blending of the adhesive binder with shredded paper particulates, which have been made acidic, and a color additive. The resultant mixture demonstrates a non-bleeding color stability and a grainy or "dry" feel. Each colored feedstock can be blended with other colored feedstock of the same or differing granularity. When the separately prepared feedstock mixtures are admixed, subjected to pressure and cured, with or without the addition of heat, the resultant solid mass forms a chaotic or disordered color pattern which the eye discerns as a natural stonelike solid.

During one preferred process for preparing a board stock of a single color and except for the collection of raw materials, four separate and distinct process stages are followed. Stage 1 involves the preparation of a relatively dry, soybean-based adhesive binder having the consistency of bread dough or children's PLAYDOUGH and an alkaline pH of the order of 11 to 13. An alkaline adhesive is desired in order to "uncoil" the high molecular weight protein fragments of the ground soybean, which may or may not be defatted, but which typically is screened to a meal or flour consistency and de-hulled.

During stage 2, various additives are blended with the adhesive binder to improve moisture resistance and impart desired mechanical hardness, strength and the like to the end product. Colorants, usually in the form of metal oxides, are added to the adhesive binder. The colorized adhesive binder typically exhibits a pH in the range of 10–12.

A shredded pulp stock is separately prepared by adding an acidic agent, for example, by spray, to a cellulosic "fluff" or pulp stock, which fluff is prepared by chopping and flailing waste paper, such as newspaper or uncoated printing papers. Alternatively, various commercially available insulations can be used and which may include a fire-retardent, such as boric acid. The granularity of the fluff can be varied as desired, for example by mixing shredded particulates of different sizes. The pH of the resulting pulp stock is typically in the range of 9–11. The colorized adhesive binder and pulp stock are next mixed at stage 3 to form one or more feedstock mixtures. The pH of each feedstock mixture which is molded or extruded to shape is preferably in the range of 7–10. The relative moisture content of each feedstock is established in the range of 12 to 20 percent, which can be obtained by partially drying the feedstock in the presence of heated air.

During stage 4, two or more single color feedstock mixtures can be further mixed in preferred proportions of colors selected to resemble mixtures of colored particles, such as quartz, that appear in natural "granite" or other decorative stone. During stage 5, a single feedstock or feedstock admixture may be progressively compacted under controlled pressures in the range of 2 to 50 tons per ft$^2$ and controlled temperatures in the range of 45 to 95 degrees Celsius to further extract undesired a portion of the water. The compacted material is final heated at slightly higher pressures to over time drive-off as vapor any remaining water, while "curing" the compacted feedstock to final form. The cured stock or resulting material may be further kiln dried and held at a controlled humidity to control dimensional stability.

Based upon an unaided visual appearance of the resulting cured stock, and even under a magnification of the order of 10×, it is believed that the natural laws governing the densification and aggregation of the mixture under heat and pressure are of similar nature to those governing the "ordered chaos" seen in a naturally formed decorative stone, such as granite. Consequently, a similar stone-like appearance of comparable consistency and uniformity is presented by the produced stock.

The density and machinability characteristics of the cured stock are comparable or better than wood or wood-like materials, such as flake or particle board. For example, the stock can be sawed, routed, planed, sanded, and finished like cabinet-grade wood. The material accepts nails and screws in a similar fashion, without fracture or splitting. The material may also be used as part of large or complex assemblies or structures constructed of a number of individual panels or pieces joined together with conventional cabinetry techniques. Provided the Danels are fabricated from the same colorant batch mixture, once bonded, sanded and finished, the seams are essentially invisible.

In contrast to polished stone, the material exhibits less than half the density, is machinable like wood and does not exhibit brittle fracture, as do natural stone materials like granite. The limited porosity of the produced material also renders it suitable for vacuum impregnation with acrylics, varnishes or other surface treatments to increase the suitability of the material for building, decorative or structural purposes.

Depending on the additives and the applied pressure and heating schedule, the surface hardness, bending modulus and tensile and compressive strength of the cured stock can also be varied from values comparable to a representative low-density fiberboard to values exceeding those of oak. A stiffness and strength exceeding that required of structural grade particle board and other building panels may also be obtained. The density may also be tailored to a range on the order of 45 to over 75 pounds/ft$^3$.

Still other objects, advantages and distinctions of the present invention will become more apparent from the following detailed description and the appended drawings and tables. Although various presently preferred constructions and methodologies are described, the description should not be construed in limitation thereto, but rather should be interpreted within the scope of the following appended claims. Considered modifications and improvements to the invention are described as appropriate. Various tested attributes are also defined. To the extent certain properties may have been observed, although may not be completely understood, considered explanations are proposed.

DESCRIPTION OF THE PREFERRED EMBODIMENT

Figure 1:
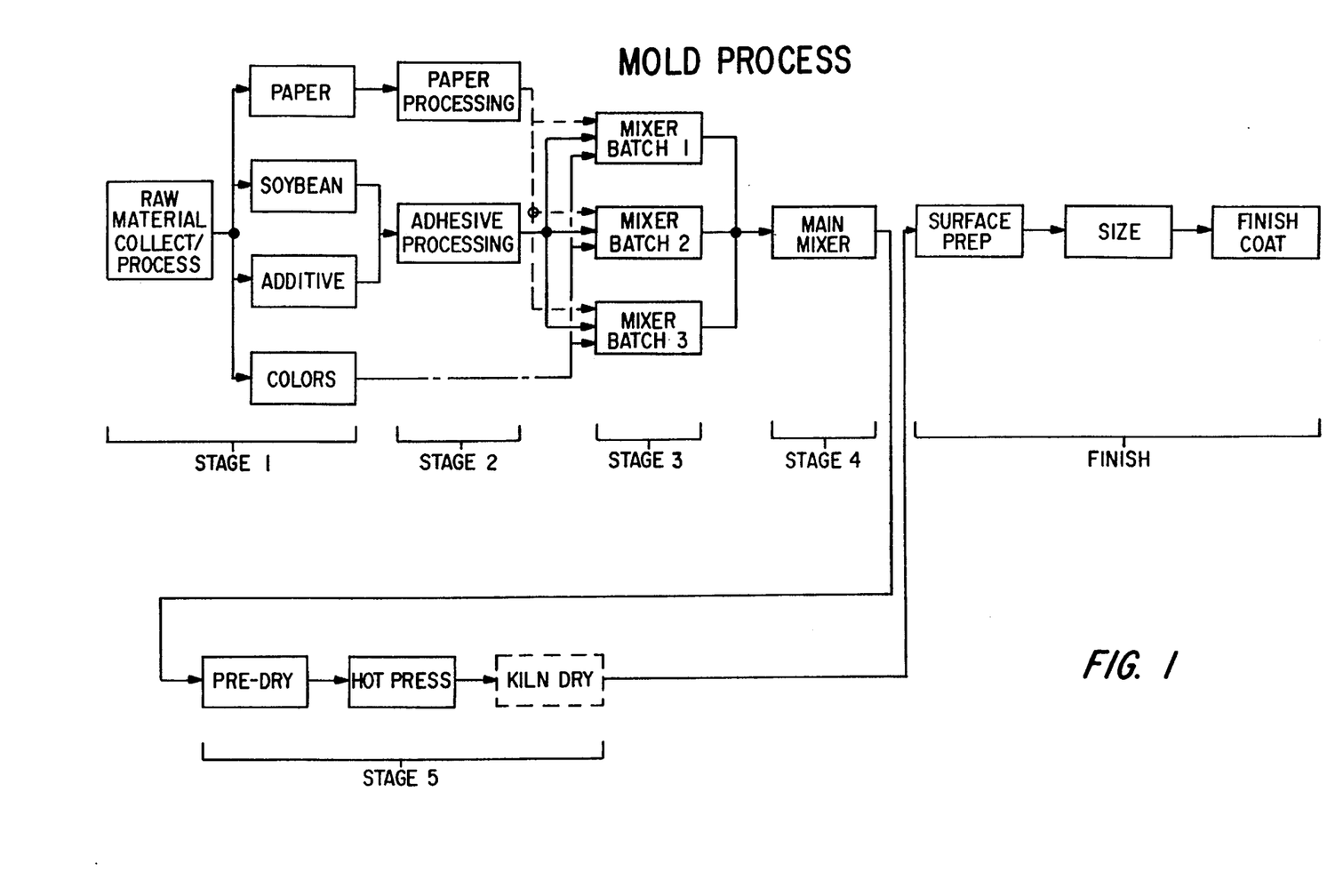
FIG. 1 is a block diagram of a preferred method of manufacture.

Referring to FIG. 1, a generalized block diagram is shown of the presently preferred process used to fabricate board stock from untreated (i.e. unbleached), pulped paper stocks, such as newspaper. The preferred process is in broad terms carried out in five distinct stages to produce a raw board or shaped stock. The raw stock is then finished with appropriate sizing, shaping and surface finishing steps to produce a final finished product. If used as a laminate or molding accent, a finished board stock would typically undergo further preparation for attachment to furniture or possibly ceiling or wall panels.

During the first or initial stage, the required raw materials are selected, graded, sorted and stored in appropriate bins in a form ready for pre-processing in stage 2. These materials typically comprise a cellulosic pulp stock of appropriately sized shredded paper particulates; a processed soybean derivative, colorants, water and miscellaneous additives. Each of the materials is described in more detail below.

During stage 2, a pulp stock is prepared by dry shredding waste paper, such as newsprint or other uncoated printing papers, to desired particulate sizes and relative size concentrations. The shredded paper is commingled as necessary with other dry materials to impart certain desired properties to the finished product (e.g. fire retardance via the addition of boric acid or an acidic additive to facilitate bonding).

An adhesive binder is separately prepared by mixing the processed soybean derivative, which may comprise a meal or flour, with water and other additives according to finished product requirements. When using a soybean meal or flour, the meal or flour is typically prepared by grinding hulled and husked, whole beans in a conventional cold grinding process to a granularity in the range of 150 to 325 mesh. The meal or flour can be de-fatted or include natural oils. If the oils are removed, this can be achieved using conventional mechanical or chemical extraction techniques. The prepared meal or flour is not otherwise washed or treated.

Monochromatic colorants are selected according to the desired color pattern prescribed for the finished product. Suitable colorants are ground metal oxides, e.g., iron oxides such as used to color cement or grout. Each colorant is separately stored, since the eventual coloration of the produced stock is obtained upon mixing proportions of the mixtures derived at stage 3.

During stage 3, one or more monochromatic batches of preprocessed components (i.e. shredded paper, adhesive binder and colorant) are mixed to defined proportions. The fibers of each batch of pulp stock is colorized with a colorant that becomes chemically bound to the fibers during mixing. A three color batch is depicted and wherein the different style lead lines indicate the mixing of the three separate colorized batches. Each feedstock may also be partially dried to a moisture content in the range of 12 to 20 percent. Drying can be achieved by passing heated air through each colorized batch as the batch is fluffed or passed along a mesh conveyor.

The separate colorized batches, in turn, are combined or admixed at stage 4 in various prescribed proportions to provide a desired feedstock yielding a reproducible "chaotic" color pattern in the finished product. The feedstock mixture exhibits the form of a loosely aggregated, multicolored, semidry flocculent material having a coleslaw consistency, which upon forming and curing yields a desired stone-like appearance.

At stage 5 the cured raw product is produced in one method by compressing and curing the feedstock under controlled heat and pressure in a hot press. Alternatively, the feedstocks can be roll pressed, reference FIG. 2, or extruded in a screw extruder, reference FIG. 5. Preferably, the material is progressively compacted and heated over time as any retained moisture is driven off and the compressed material is cured.

At the finish stage, the raw shaped product is surface finished, sized and final shaped according to various market requirements by sanding, planing, sawing, shaping or other appropriate machining. The surface may also be coated or impregnated with preferred sealants, lacquers, varnishes or the like.

By bonding individual board stock components together, seamless appearing complex shapes and assemblies can be formed. Composites with other materials can also be obtained, such as by inlay. Seamed assemblies preferably are formed from stock prepared from common color batches to minimize any color differentiation.

A more detailed description of the process stages 2 through 5 of FIG. 1 follows. Various alternative mixtures or process variations are also described as regards a number of desirable finished product characteristics.

The principal concern during the preparation of the adhesive binder is to prepare a low cost binder which is capable of evenly wetting, coating and bonding the fibers and colorant of the cellulosic pulp stock. Most adhesives are rather costly, even if purchased in large quantity, and thus are not suitable for use in the preferred embodiments. Accordingly, many resin glues have been passed over.

In addition to cost, the adhesive binder must preferably retain its stability in the presence of microwave, radio frequency or thermal energy. Additional desirable attributes are that the adhesive not be susceptible to foaming, have a relatively low moisture content, have an alkaline pH in the range of 8 to 12, and demonstrate a moisture resistance, once set or cured. Non-petroleum based adhesives and, in particular, starch and protein based adhesives have been used to advantage. Suitable protein based adhesives can be derived from various agricultural grains and pulse crops, most notable are soy beans.

A presently preferred adhesive binder is derived from processed soybeans. The soybeans are hulled, husked and ground to a meal or flour-like consistency, which in flour form is on the order of 150 to 325 mesh. As desired, the beans may be pre-washed and may be stripped of natural oils via known mechanical and chemical treatments. Oils may also be added to reduce later foaming. Added to the soybean derivative in suitable quantity and as desired or necessary are various additives such as sodium or potassium hydroxide, sodium silicate, polyvinyl acetate and latex. The latter additives impart various desirable properties to the finished product and/or facilitate the removal of water and other liquids in later stage processing. Moisture resistance, fire retardance, mold resistance, elasticity and surface hardness represent some of the aforementioned desirable properties.

A variety of industrial batch mixers are available, which satisfy the requirements for mixing the adhesive binder and the colorants and pulp stock with the binder, and which accommodate various batch sizes. A continuous feed mixer, such as a ribbon blender, may also be used to advantage to continuously blend each separately colored batch of feedstock. Appropriate proportioning controls are required to assure the proper compositions of the feedstock ingredients. More of the details of such equipment are described with reference to FIG. 2.

The principal cellulose filler material of the preferred mixtures is a shredded or pulverized newsprint. Depending upon various appearance and mechanical attributes desired for the finished end product, the particulate size of the newsprint can be varied. That is, the particulate size may range from finely ground newsprint, which is ground to the consistency of fibrous materials such as flax or cotton, to a chopped material having nominal particulate dimensions of approximately ¼ by ½ inches. Combinations of differently sized particulates may also be used.

A desirable attribute of newsprint is that the derived cellulose fibers are essentially lignin-free, which facilitates the surface absorption and wetting of the fibers of the cellulose with the adhesive binder. Newsprint, and most uncoated printing papers are essentially lignin free, since the lignin is typically removed during the processing of the wood fibers. The protein chains of the present soybean based adhesive binders when mixed in an alkaline to neutral solution with the cellulose material are believed to bond to the cellulose fibers by inducing a motioned, uncoiling and re-coiling of the fibers upon wetting. The re-coiling traps the added colorants and adjacent fibers to form a very strong molecular, inter-particle bond.

Figure 4:
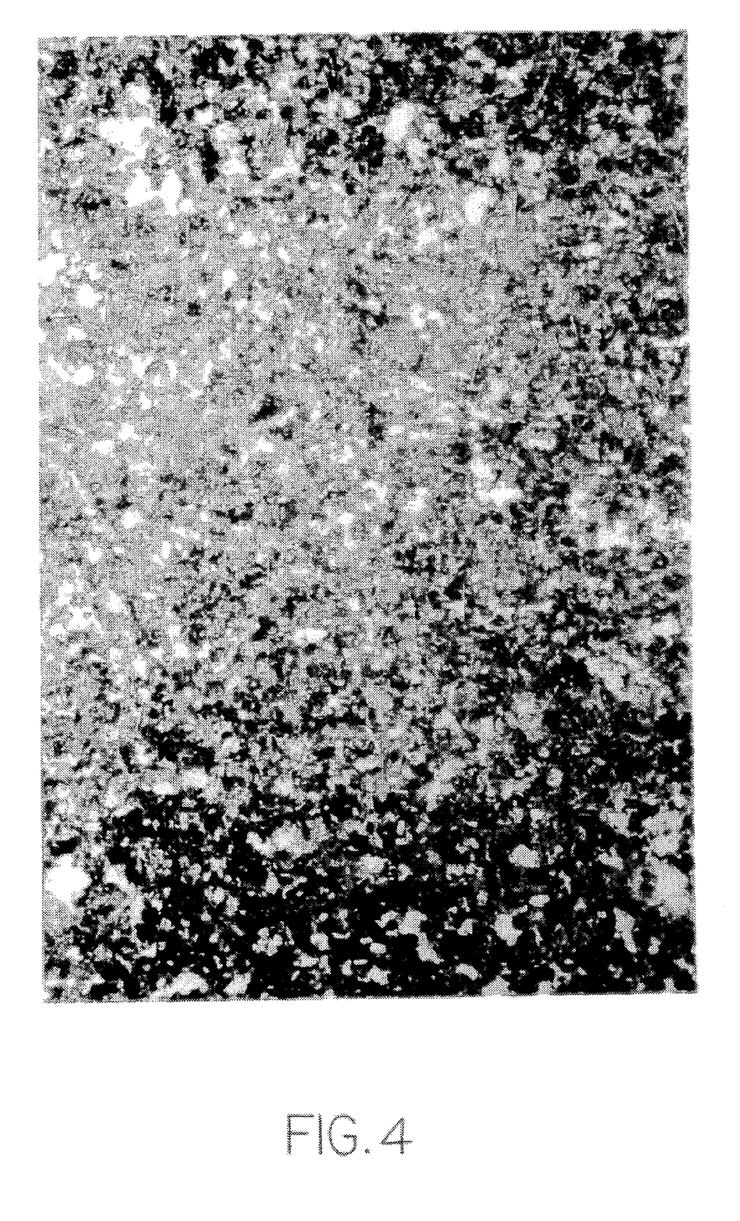
FIG. 4 is a photograph of the stone-like, granular structure exhibited by board or extruded stock formed from the invention.

In preferred mixtures, the newsprint is shredded to a particulate size in the range of $\frac{1}{10}$ to ¼ by $\frac{1}{10}$ to ½ inches. Other sized particles and shapes may also be used. Such particulates, when mixed with suitable colorants, in the following described fashion, provide board stocks which exhibit a "stone-like" appearance. That is, a granular appearance is exhibited which in one instance closely resembles granite. Other appearances are attainable upon varying the concentrations of the sized particulates and colorants. FIG. 4 depicts a photograph of the granular structure and stone-like appearance of a section of board stock prepared with the invention.

Although shredded newsprint can be used by itself, other fibrous materials may be included to provide certain desirable attributes. For example, chopped fiberglass, spun plastics or other fibrous additives of appropriate fiber length can be incorporated into the feedstock. Depending upon the fibrous material, the fibers can be randomly dispersed or mixed in various fashion to predetermined alignments. Where a directional fiber layering is used, a board stock can be developed from multiple laminations having specific axial alignments of the added fiber. The derived board stock can thereby exhibit preferential bending, shaping, shear or tear characteristics. Alteratively, laminations of random fiber alignment can be laid down one upon another. In all cases, however, a stone-like appearing board stock is obtained with improved structural integrity.

The colorants used in the preferred embodiment consist of various, generally inorganic, metal based coloring materials. In the presently preferred mixtures, ground metal oxide colorants are incorporated without further preprocessing. Such colorants are commonly used to color cement and grouts. It is believed that many other types of coloring agents could be used to comparable advantage.

The required attributes of any colorant are color fastness under heat and pressure. Most importantly each colorant, once mixed with the pulp stock particulates or fibers of one color batch, must not bleed or transfer color to adjacent fibers. Color fastness must exist in each colorized batch prepared in stage 3, the admixed feedstock derived at stage 4 and in the final formed board or shaped stock. All of these requirements are met by commercially available colorants when processed according to the teachings of the current invention.

As discussed at stage 3 of the molding process of FIG. 1, three batches of the pre-processed feedstocks are prepared. Each batch includes a single monochromatic colorant. More or less batches of the same or different volumes may be mixed as necessary to obtain the proportions required to achieve a desired type and color of board stock. Table I, below, summarizes a preferred process sequence for the preparation of a single monochromatic batch of feedstock through stages 2 and 3.

TABLE I

SINGLE COLORANT FEEDSTOCK PREPARATION

| | Ingredient | Amount (wght units) |
|---|---|---|
| Stage 2: | | |
| Step 1: | Add Water (60–70 degrees F.) | 175 |
| | Ground Soybean | 97 |
| | Pine Oil | 3 |
| | Mix 3 minutes or until smooth | |
| Step 2: | Add Water (60–70 degrees F.) | 169 |
| | Mix 2 minutes or until smooth | |
| Step 3: | Add 25% Sodium Hydroxide Solution | 14 |
| | Mix 1 minute | |
| Step 4: | Add 'N' Brand Sodium Silicate | 25 |
| Step 5: | Add Soy Glue #5-27-92/1 | 117.25 |
| | Polyvinyl Acetate | 23.5 |
| | Mix 1 minute | |

TABLE I-continued

SINGLE COLORANT FEEDSTOCK PREPARATION

| | Ingredient | Amount (wght units) |
|---|---|---|
| Step 6: | Add H.B. Fuller WB-2523<br>Mix 1 minute | 62 |
| Step 7: | Add H.B. Fuller RM-0255<br>Mix 1 minute | 60 |
| Stage 3: | | |
| Step 8: | Add Desired metal oxide colorant<br>Mix 1–2 minutes | 8 |
| Step 9: | Add Mixture from Step 8<br>Cellulose pulpstock (treated)<br>Mix until mixture takes on a semi-dry coleslaw consistency | 5<br>1 |
| *ph adjust | | |
| Step 10: | Add 40% Aluminum Sulfate solution | 1 |
| | Resultant from Step 9 | 50.2 |

*Note: 40% Alum Solution is sprayed onto the resultant mixture from Step 9 to decrease the pH of the mixture to approximately 6–7.

Modest variations of the formulation of Table I has been shown to produce final formed board or shaped stock with more stable or optimized mechanical properties. Tables II and III, below, have each been shown to produce stock with improved properties of hardness and moisture sensitivity.

TABLE II

FEEDSTOCK FORMULATION-BASELINE

| Ingredient | (% by weight) | |
|---|---|---|
| Water | 55.9 | |
| Cellulose (paper) | 16.9 | |
| Soy flour | 15.8 | |
| Sodium silicate | 4.1 | (50% in water) |
| Sodium hydroxide | 2.3 | (50% in water) |
| Lime | 1.9 | |
| Styrene-butadiene latex | 1.6 | |
| Tint | 0.7 | |
| Pine Oil | 0.5 | |
| H.B. Fuller WB-2523 | 0.3 | |
| | 100.0 | |

TABLE III

FEEDSTOCK FORMULATION-WATER RESISTANT

| Ingredient | (% by weight) | |
|---|---|---|
| Water | 54.8 | |
| Cellulose (paper) | 17.7 | |
| Soy flour | 15.4 | |
| Sodium silicate | 4.0 | (50% in water) |
| Potassium hydroxide | 3.1 | (45% in water) |
| Lime | 1.9 | |
| SBR latex | 1.6 | |
| Tint | 0.7 | |
| Pine Oil | 0.5 | |
| H.B. Fuller WB-2523 | 0.3 | |
| | 100.00 | |

A similar process is followed to prepare each separate batch of differently colored feedstock. Once prepared, each of the separate feedstock batches is stored until combined at stage 4 as shown in FIG. 1.

At stage 4, desired proportions of the pre-processed feedstock batches are combined in a main or primary mixing step to provide the final feedstock used in the stage 5 processing. The color pattern ensuing in the derived board stock is entirely determined by the relative proportions of each of the batch feedstocks in the admixture. For example, to provide a board stock product that virtually duplicates the appearance of natural "red" granite, separate red, black and white feedstock batches are prepared. The individual white, red and black batch stocks are then mixed in weight percentage ratios of 25:37.5:37.5 to form the stage 5 feedstock.

Upon blending the colored feedstock batches at stage 4, a relatively dry mixture is obtained. The consistency of the mixture is similar to coleslaw. This consistency is significantly different from the aqueous slurries that are prepared in the earlier referenced recycled newsprint processes.

In spite of the relatively low water content of the stage 4 feedstock mixture, at stage 5 the admixture is preferably subjected to a pre-drying, which for the compression molding process of FIG. 1, may include one or more pre-forming or partial compression steps to further remove a portion of the alkaline liquid and to consolidate the mixture. Final water removal occurs at the "hot press" step or stage 5 of FIG. 1 or the second roller compression step of stage 5 in the continuous extrusion process of FIG. 2. While a small quantity of moisture enhances the reaction of the adhesive binder with the fibrous cellulose and additives and promotes preferential bonding, extraneous water hampers later curing and can increase production costs.

During the pre-dry step of FIG. 1, a quantity of water in the range of 50 to 65 percent by weight of the water initially present in the admixed feedstock is removed. For example, for a feedstock batch initially weighing 13 pounds, a volume of water weighing approximately 4 pounds is removed prior to subjecting the material to one or more final heating and curing steps.

The water is removed by partially compressing the feedstock over one or more compression cycles or through a progressive compression over time. The feedstock may simultaneously be subjected to microwave or radio frequency energies or a thermally controlled environment for a sufficient duration to uniformly heat the mixture to an average cross-sectional temperature on the order of 45–95 degrees Celsius. Such heating facilitates moisture release. Because microwave or radio frequency heating provides a relatively uniform energy distribution throughout the volume of the material, such a heating method is preferred. Alternatively, infrared and other convection or contact heating methods can be employed.

The admixed feedstock of stage 4 may also be pre-dried with air before being pre-formed at stage 5. This can be accomplished, for example, by passing dry heated air through a layer of the feedstock supported by an open metal mesh belt. An air temperature of 140 to 180 degrees Fahrenheit and exposure time up to 30 minutes may be used to decrease moisture content to 12 to 20 percent prior to hot pressing. The extraction of water from the admixed feedstock permits a more rapid heating in the molding press, without creating significant quantities of steam or liquid. For example, a cured one inch thick board can be formed during the hot press step of FIG. 1 upon applying 300 to 550 psi to the pre-dried feedstock with press platens held at 280 to 320 degrees Fahrenheit over a period 5 to 30 minutes. Without air drying the feedstock, several additional minutes would be required with consequent greater energy usage. Regardless of the curing process, pre-drying the feedstock with air provides advantages to the overall process.

Without pre-drying or air drying the feedstock, conventional thermal heating processes have demonstrated certain disadvantages. That is, unless the material is subjected to relatively long heating times, a "skin effect" can occur which tends to harden the outer surfaces of the board stock and prevent the release of internal moisture. Interior temperatures can also artificially rise to the point where chemical bonding between the adhesive and fibers is damaged. Edges may also char or become brittle to the point where additional mechanical processing is required to remove the unusable edges. Pre-drying the admixed feedstock with air is therefore desired for a production process which incorporates conventional radiant heating or thermal curing equipment.

Final curing during the hot press step of FIG. 1 may be achieved in a microwave or radio frequency heated environment. Although such heating appliances are tolerant to moisture, energy requirements are reduced if unnecessary moisture is first removed, such as by pre-drying the feedstock admixture. Pressures in the range of 200 to 300 psi are typically, progressively applied during the pre-forming step and increased to 300 to 500 psi during the final curing step. Once compressed to final form, the feedstock is re-exposed during a final exposure to the microwave or radio frequency heating energy and cured to final shape. It is to be appreciated the compacted feedstock can either be alternately heated and compressed or simultaneously heated and compressed.

The duration of the final cure exposure and applied thermal energy are selected in relation to the thickness and desired density of the board stock being prepared. For a nominal board stock of 1 inch thickness, an exposure time in the range of 3 to 5 minutes and 2 to 5 kilowatts per square foot at microwave frequencies up to 2.5 GHz has produced suitable board stock. Although higher frequency microwaves may provide certain advantages, most commercial grade ovens operate at lower RF frequencies of 13.6, 27, 44 and 100 MHz. The lower RF frequencies are equally effective to obtain final curing.

Figure 3:
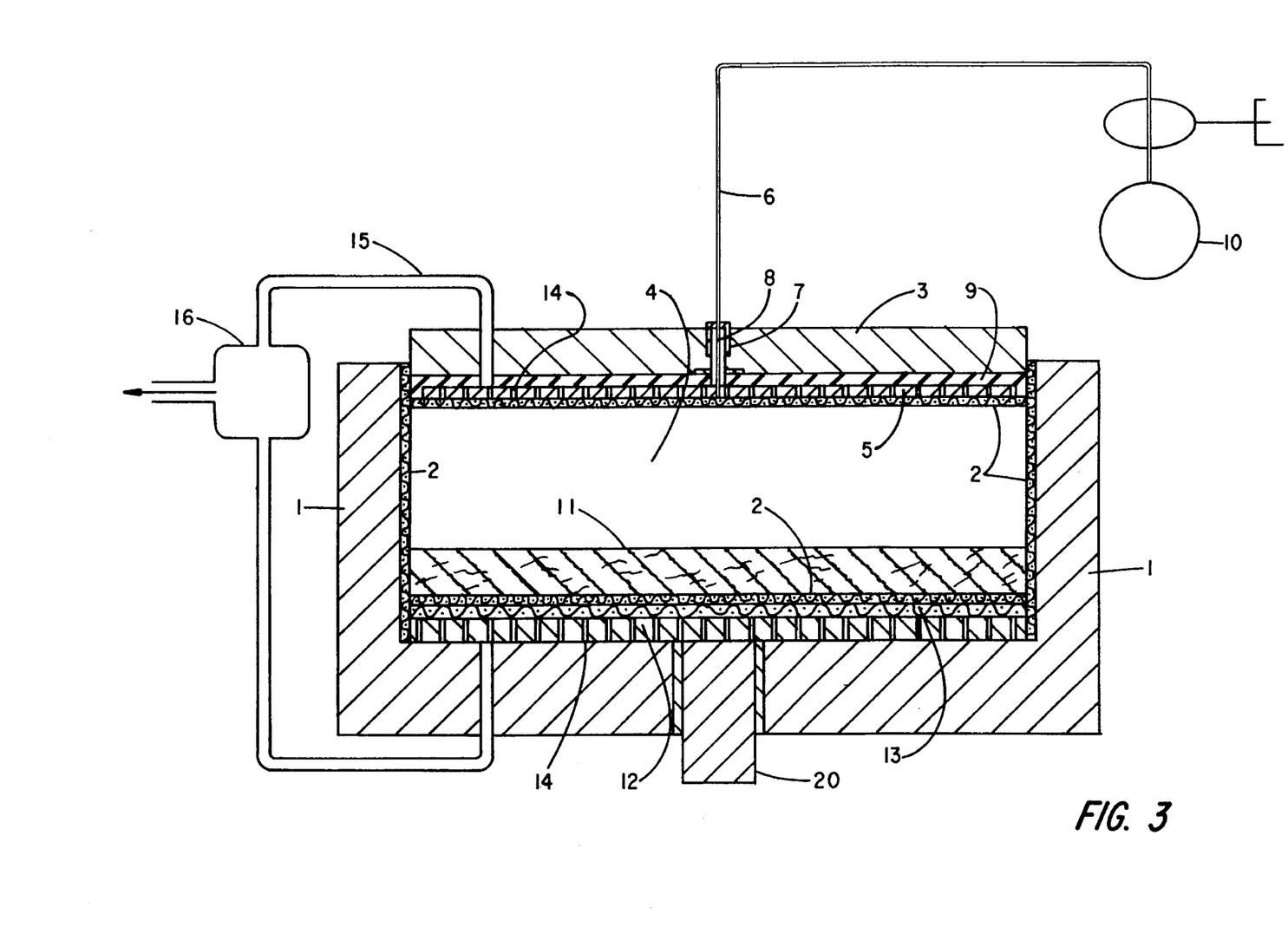
FIG. 3 is a drawing of a microwave or RF curing station wherein RF or microwave coupling plates compress and form the end product.

Depending upon the stock being prepared, a suitable oven or heated press is selected which is capable of compacting the feedstock to desired size and providing a preferred stock throughput rate and energy consumption. The particular heated, pour batch molding press or "hot press" used in the process of FIG. 1 is shown at FIG. 3 in cross-section view. This heated molding press is suitable for hot pressing a single piece of board stock.

The body of the press mold is constructed of suitable heavy metal side and bottom walls 1. The walls must be capable of withstanding the maximum molding pressure and may or may not be lined with a porous member 2 to facilitate removal of extracted liquid, such as a screen. A movable top wall or compression plate 3 is provided along the top of the mold and is coupled to hydraulic means (not shown for convenience and clarity, but similar to the piston 20 described below) for directing the plate 3 to compress any feedstock material contained in the mold cavity 4.

The compression plate 3 includes an RF or microwave plate electrode 5 which is fed by a suitable coaxial cable or waveguide 6 through a connector 7 from an RF or microwave generator 10. The center conductor 8 of the cable 6 passes through an electrical and thermal insulator plate 9 which separates the compression plate 3 from the electrode 5. Any substitute plate 5 should be capable of providing adequate heating to the feedstock.

Once the feedstock is compressed and heated to a final stock form as shown at 11, the stock is extracted from the mold cavity 4 via the piston 20. The piston 20 is secured to a plate 12 along the bottom wall 1 of the mold. An additional porous member 13 may be placed below the member 2 and between the formed board stock 11 and the plate 12 to facilitate removal of released moisture. Either or both the bottom and top plates 12, 5 also contain an array of holes or channels 14 to permit the extraction of released moisture via insulating tubing 15 and a vacuum or other suitable suction pump 16.

Figure 2:
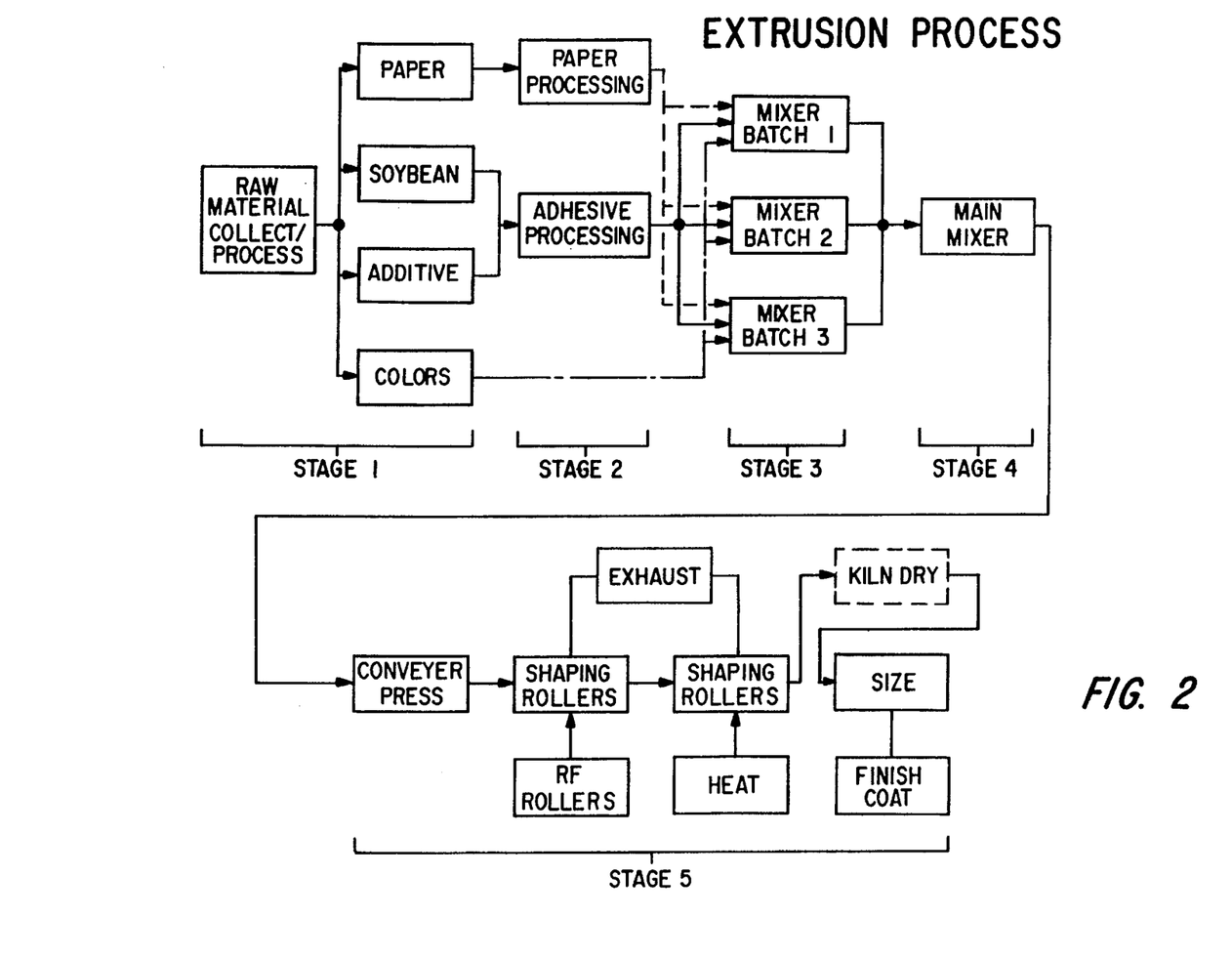
FIG. 2 is a block diagram of an alternative method of manufacture.
Figure 5:
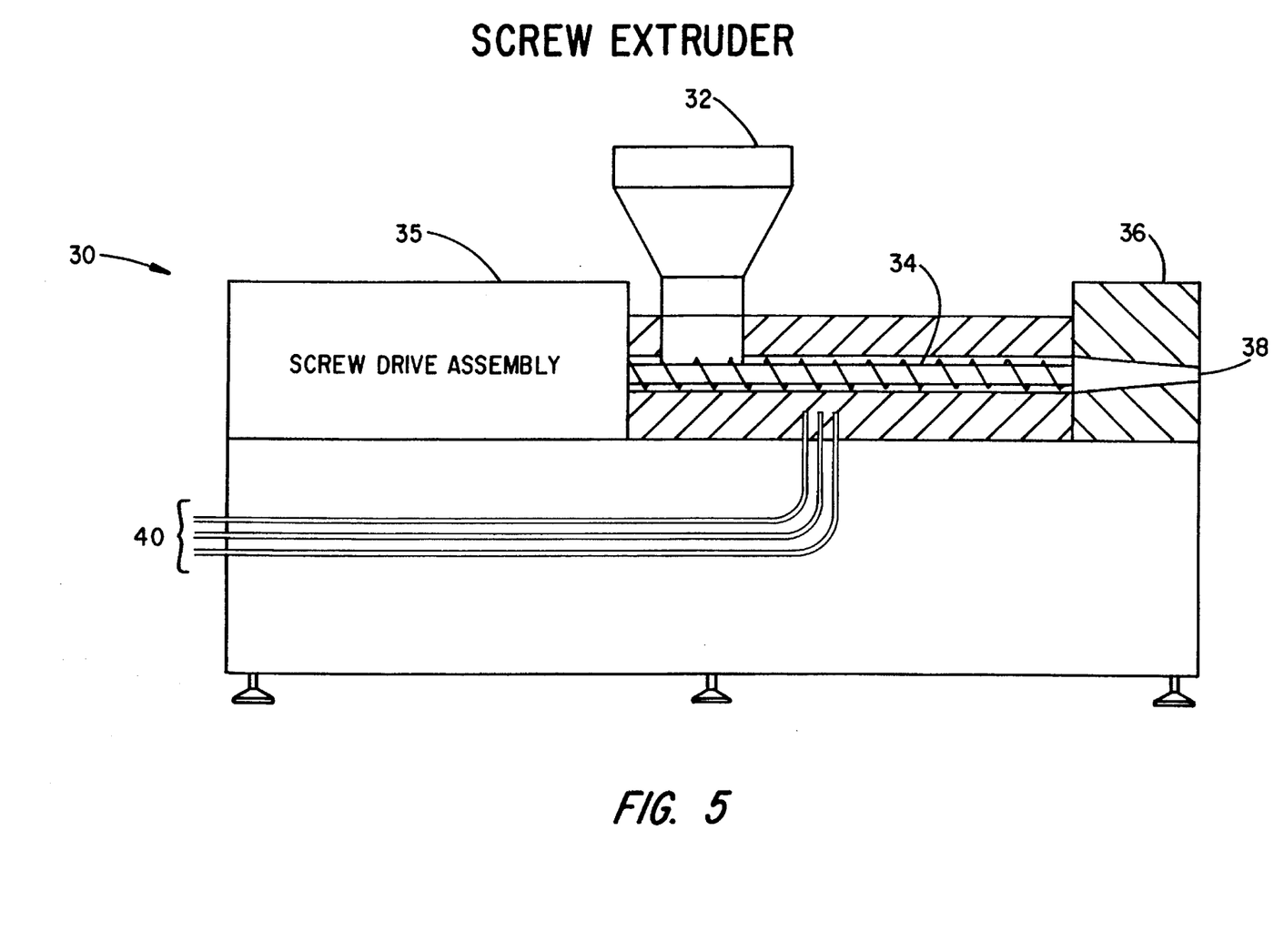
FIG. 5 is a drawing of a continuous extruder station.

With attention next directed to the extrusion process of FIG. 2, a generalized block diagram is shown of a continuous production process, rather than a batch process. Such a process and related production equipment can be constructed to provide board stock thicknesses varying from ⅛ to 2 inch thickness and would typically include an extrusion molder that includes a continuous feed oven or heating assembly. The configuration of a screw type extrusion apparatus 30 which could be used in the extrusion process is shown at FIG. 5.

With the exception of the final stage 5, each of the process stages of FIGS. 1 and 2 are the same, use comparable equipment and generally follow the steps and use feedstocks of Tables I, II and III. That is and as in FIG. 1, a mixer is provided at stage 2 to receive appropriate solids and liquids from the raw material storage hoppers or liquid supply lines of stage 1. Motorized paddles or augers mix the separate pulp stock and adhesive binder ingredients to a preferred consistency before transferring the ingredient mixtures to a mixing station at stage 3 for preparing each of the colorized feedstock batches.

In lieu of separate mixing stations at stages 2 and 3, a single mixer may be provided that includes a hopper. The hopper can contain a suitable supply of shredded, pre-processed pulp stock. The hopper may also include a shredder mechanism for final shredding the pulp stock to an appropriate particulate size or shredding an additive pulp stock mixed with the base pulp stock. Once appropriate quantities of the adhesive binder and pulp stock are admitted to the mixer, the materials are blended with the colorant and any additional additives, such as strengthening fibers, etc., are admixed.

The batches of monochromatic colorant mixtures are next admixed at stage 4 at either a different mixer station or combined using the mixer of stage 3. The produced feedstock is next fed through a screw drive extruder 30, such as shown at FIG. 5. The feedstock is particularly received at a material intake 32 and lowerlying screw 34, which is driven by a drive system 35, the feedstock is progressively compressed, extraneous liquids are removed and the feedstock is shaped by forcing the feedstock through an appropriately configured extrusion die 36. The shape of the die orifice 38 can be varied as desired. For a board stock, a wide, shallow height rectangular orifice 38 is used. The temperature of the feedstock along the path of the screw 34 can be varied with provided heaters which surround the screw 34 and control signals applied at temperature control lines 40.

Upon exiting the extrusion die 36, the extruded material is typically admitted to a sequential arrangement of shaping rollers, such as roll formers or pinch rollers, which may include or be separated by intervening RF, microwave or thermal heating appliances. The feedstock is progressively compressed as the feedstock is further heated. Final compression and forming occurs at the outboard section of shaping rollers. Residual moisture and vapor is bled off at each roller section prior to the shaped feedstock being final cured. Final curing can occur in a larger oven appliance which may surround the rollers or at a separate oven appliance which cures the formed feedstock to proper composition and dryness.

A post-curing or kiln drying process, as shown in dashed line, may be incorporated into either of the processes of FIGS. 1 and 2. Whether the raw stock is formed by compression at FIGS. 1 and 3 or extrusion at FIGS. 2 and 5, it typically will retain 9 to 12 percent moisture. Preferably, this can be reduced to below 4 percent, or even well below 2 percent, in a heated kiln. Kiln drying is typically performed over 6 to 24 hours at an oven temperature of 250 to 320 degrees Fahrenheit. Once dried, the raw stock is preferably stored in a controlled humidity environment to return to 6 to 8 percent moisture in order to enhance long-term dimensional stability.

Once cured and following either the batch process of FIG. 1 or the continuous extrusion process of FIG. 2, the raw stock is sequentially admitted to appropriate surface preparation, sizing, and shaping stations where appropriate sanding and surface forming assemblies prepare the stock to proper dimension. Subsequently, the material is admitted to a finish coating station where appropriate surface coatings are applied to the material. Board stock of thicknesses ranging from ⅛ to 1 inch is readily obtained from the present invention, either in the primary molding process or upon subsequent surface finishing. Other thicknesses may also be obtained with process adjustments.

Table IV, below, discloses a listing of certain measured mechanical properties which confirm the integrity of obtained board stocks derived from the feedstock mixtures of Tables I, II and III. Such measurements were taken using generally accepted testing techniques and equipment.

TABLE IV

PROPERTIES OF PROCESSED BOARD STOCK OF TABLE I

| Product Density: | Low | High |
|---|---|---|
| Press psi | 200 | 600 |
| Final Density lb/ft$^3$ | 25 | 80 |
| Specific Gravity | 0.40 | 1.28 |
| Young's modulus, psi | 500,000 | 1,200,000 |
| Modulus of Rupture, psi | 2,000 | 4,500 |
| Ball Hardness, lb | 1,900 | 3,800 |
| Immersion Moisture Absorption, % | 19 | 12.5 |
| Linear Expansion at 90% relative humidity, % | 1.4 | 0.2 |

Table V demonstrates comparable measured values of wood based products to raw board stock samples A–D of a one inch thickness, which were produced in accord with the above.

TABLE V

COMPARATIVE PROPERTIES 24 HR

| IMMERSION Property ABS. Measured | MOR (KPSI) | MOE (KPSI) | BOND (PSI) | HARDNESS (POUNDS) | MOIST. (WT. %) |
|---|---|---|---|---|---|
| Representative Wood-Based Products | | | | | |
| Type 1 Part. spec ANSI A208.1 (Typ 15-40) 1-H-3 | 3.40 | 400 | 140 | 1500 | No |
| Type 2 Part. spec ANSI A208.1 2-H-2 | 3.40 | 400 | 300 | 1800 | No |
| Mat-formed Wood; Part. High Dens. | 2.4–7.5 | 350–1000 | 125–450 | | 15–40% |
| Waferboard | 2.0–3.5 | 450–650 | 50–100 | 700–1000 | 10–30% |
| Oak | 12.20 | 2500 | | 1138.00 | 21% |
| Pine | 11.60 | 1600 | | 378 | 25% |
| Sample Boards | | | | | |
| Sample A | 2.0–4.6 | 550–1200 | | 3500–7200 | 14–40% |
| Sample B | 2.5 | 570 | | 4600 | 25% |
| Sample C | 2.85 | | >250 | 4800 | 32% |
| Sample D | 4.90 | 1300 | | 5600 | 21% |

A desirable attribute of the board stock produced by either of the processes of FIGS. 1 or 2 is that the material is relatively dense and thus can be finished to a relatively smooth surface. Correspondingly, the edges accommodate conventional finger, or butt jointing and other jointing techniques to enable the production of larger, complex pieces from multiple smaller pieces. Because, too, of the unique homogeneous color patterns exhibited throught an entire volume of the produced stock, essentially seamless joints are obtained. Complex shapes, such as corner molding, contours and orthogonal jointed corners can also be formed with invisible seams at the juncture of two pieces of the same material.

A further attribute of derived board stocks is that compositional or inlaid board stock can be fabricated, using the batch processing method. In such instances and for the process of FIG. 1, separately prepared inlay members, such as commemorative plates, name tags or the like, and which can comprise almost any organic material (e.g. wood or plastics), or inorganic material (e.g. metal) can be inserted into the press mold prior to stage 5. Once the feedstock is added and compressed during the molding process, it forms around and in intimate contact with the inlay material. Upon final curing, a strong contact is made between the inlay and board and the inlay, becomes an integral part of the resulting board stock.

Still another attribute of the invention and using the process and equipment of FIGS. 1 and 3 is the ability to machine the upper and/or lower plates either in cameo or intaglio with a desired figure or shape. When the feedstock is pressed in the mold, the board stock will retain an image of the pattern provided in the mode plate either intaglio or cameo, depending upon whether the mold plate pattern is raised or inset. Upon curing the raw product or board stock, the pattern is retained in fine detail.

Although the invention has been described with respect to various presently preferred mixtures and production equipment, it is to be appreciated that still other methods and mixtures may be suggested to those skilled in the art. Accordingly, it is contemplated that the foregoing description should be interpreted to include all those equivalent embodiments within the spirit and scope thereof.

What is claimed is:

1. A method for preparing a pressure-formed article comprising:
   (a) preparing an adhesive binder having a pH of about 10–13 from a legume derivative and water; wherein the adhesive binder includes a colorant;
   (b) blending the adhesive binder with shredded cellulosic material to form a semidry flocculent material;
   (c) reducing the moisture content of the semidry flocculent material;
   (d) combining at least two differently colored batches of semidry flocculent material; and
   (e) pressing the flocculent material having a reduced moisture content at a temperature and pressure effective to fuse the flocculent material to form a pressure-formed article having a stone-like granular appearance.

2. The method of claim 1 wherein the cellulosic material is newsprint.

3. The method of claim 1 wherein the legume derivative is a pulse crop derivative.

4. The method of claim 3 wherein the pulse crop derivative is soybean meal.

5. The method of claim 1 wherein the step of combining at least two differently colored batches of semidry flocculent material occurs prior to the step of reducing the moisture content of the semidry flocculent material.

6. The method of claim 1 wherein the colorant is a metal oxide colorant.

7. The method of claim 6 wherein the metal oxide colorant is an iron oxide colorant.

8. The method of claim 1 wherein the pressing step comprises pressing the flocculent material in a hot press.

9. The method of claim 1 wherein the pressing step includes extruding.

10. The method of claim 1 wherein the step of reducing the moisture content of the semidry flocculent material comprises compressing the semidry flocculent material in a mold.

11. The method of claim 10 wherein the step of pressing to fuse the flocculent material comprises exposing the material to microwave energy.

12. A method for preparing a pressure-formed article comprising:
   (a) preparing a colored adhesive binder having a pH of about 10–13 from a pulse crop derivative and water;
   (b) blending the adhesive binder with shredded newsprint to form a semidry flocculent material;
   (c) reducing the moisture content of the semidry flocculent material;
   (d) combing at least two differently colored batches of semidry flocculent material; and
   (e) pressing the flocculent material having a reduced moisture content at a temperature and pressure effective to fuse the flocculent material to form a pressure-formed article having a stone-like granular appearance.

13. The method of claim 12 wherein the step of combining at least two different colored batches of semidry flocculent material occurs prior to the step of reducing the moisture content of the semidry flocculent material.

14. The method of claim 12 wherein the colored adhesive binder includes a metal oxide colorant.

15. The method of claim 14 wherein the metal oxide colorant is an iron oxide colorant.

16. The method of claim 12 wherein the pulse crop derivative is a soybean derivative.

17. The method of claim 16 wherein the soybean derivative is a soybean meal.

18. A method for preparing a pressure-formed article comprising:
   (a) preparing a colored adhesive binder having a pH of about 10–13 from a soybean derivative and water;
   (b) blending the adhesive binder with shredded newsprint to form a semidry flocculent material;
   (c) combining at least two differently colored batches of semidry flocculent material prior to the step of reducing the moisture content of the semidry flocculent material;
   (d) reducing the moisture content of the mixture of colored batches of semidry flocculent material; and
   (e) pressing the flocculent material having a reduced moisture content at a temperature and pressure effective to fuse the flocculent material to form a pressure-formed article having a stone-like granular appearance.

19. A pressure-formed article preparable by the method of claim 1.

20. The pressure-formed article of claim 19 comprising board stock.

21. A pressure-formed article preparable by the method of claim 12.

22. A pressure-formed article preparable by the method of claim 18.

23. A pressure-formed article comprising fused flocculent material prepared from an aqueous legume-based adhesive binder and cellulosic material; said pressure-formed article having stone-like granular appearance.

24. The pressure-formed article of claim 23 wherein the cellulosic material comprises pulverized newsprint and the legume-based adhesive binder comprises a ground leguminous material comprising a ground pulse crop.

* * * * *

UNITED STATES PATENT AND TRADEMARK OFFICE
CERTIFICATE OF CORRECTION

PATENT NO. : 5,611,882
DATED : March 18, 1997
INVENTOR(S) : Riebel et al.

It is certified that error appears in the above-identified patent and that said Letters Patent is hereby corrected as shown below:

On the title page:

In first column, insert --[63] Continuation-in-part of Serial No. 928,965, August 11, 1992.--

Col. 1, line 54, delete "various" and insert --Various--

Col. 4, line 55, delete "Danels" and insert --panels--

Col. 11, line 48, delete "walls" and insert --walls 1--

Signed and Sealed this

Twentieth Day of January, 1998

BRUCE LEHMAN

Attest:

Attesting Officer

Commissioner of Patents and Trademarks